Jan. 13, 1970   J. K. TAYLOR ET AL   3,489,013
VIBRATION ANALYZING APPARATUS
Filed Oct. 22, 1965   2 Sheets-Sheet 1

INVENTORS
James K. Taylor and
Carl J. Spehr.
BY
ATTORNEY

United States Patent Office 3,489,013
Patented Jan. 13, 1970

3,489,013
VIBRATION ANALYZING APPARATUS
James K. Taylor, Columbus, and Carl J. Spehr, Gahanna, Ohio, assignors to International Research and Development Corporation, Worthington, Ohio, a corporation of Ohio
Filed Oct. 22, 1965, Ser. No. 501,264
Int. Cl. G01m 1/16
U.S. Cl. 73—466
8 Claims

ABSTRACT OF THE DISCLOSURE

Described is vibration analyzing apparatus of the electronic stroboscopic type, characterized in that changes in phase of the firing pulses for the stroboscopic lamp are minimized for variations in amplitude of an input oscillatory vibrational signal. Also described is electronic vibration analyzing apparatus which is battery-powered and wherein the drain on the battery required to fire the stroboscopic lamp is minimized.

---

As is known, vibration analyzing apparatus, in its simplest form, includes an electromagnetic transducer or vibration pickup which transforms mechanical motion resulting from vibrations into an oscillatory electrical signal having a fundamental frequency equal to that of the vibrations and an amplitude proportional to the magnitude of the vibrations. The resulting signal is then shaped in suitable circuitry and employed to fire a strobe light periodically at the fundamental frequency. If the vibrations are being picked up from a single rotating part, the strobe light will be fired once during each revolution of the part; and if the strobe light is directed against the vibrating part, a visible mark on that part will appear to be stationary. By applying trial weights to the rotating part and observing the angular shift of the part as viewed under the flashing strobe light, the heavy point of the part causing the vibration can be located and its magnitude can be determined so that the unbalance condition can be corrected. See, for example, U.S. Patent No. 2,711,647 for a showing of typical balancing apparatus of the type described above.

In order for the balancing equipment to function properly, the vibration signal which contols the strobe light must be that produced by vibrations from a single rotating part onto which the strobe light is directed. Since it often happens that two or more sources of unbalance are present in a piece of equipment and are vibrating at different frequencies, an adjustable filter must be provided in the equipment to select only those vibrations resulting from motion of the part under investigation. Furthermore, the equipment must incorporate an amplitude meter such that the magnitude of the vibrations can be determined; and should also incorporate an internal oscillator which can be used to determine the speed of rotation of a particular rotating part, for slow-motion studies and the like.

The present invention is concerned with improvements in vibration analyzing apparatus of the type described above; and in this respect, the objects of the invention include:

To provide vibration analyzing apparatus employing solely solid-state active circuit elements. This materially reduces the weight of the overall unit and unexpectedly, achieves improvements in circuit performance as will hereinafter be described in greater detail.

To provide vibration analyzing apparatus which can be operated from either a conventional 120-volt alternating current outlet or, alternatively, from an internal battery supply.

To provide means for firing a stroboscopic lamp from a low voltage direct current battery supply.

To provide vibration analyzing apparatus having greatly improved frequency response characteristics. Thus, whereas prior vibration analyzing apparatus of the type described herein was capable of handling frequencies up to a maximum of about 5000 cycles per minute, the present invention provides a unit capable of handling frequencies as high as 8000 cycles per second.

To provide means for firing a stroboscopic lamp in vibration analyzing equipment in response to an oscillatory vibration signal having a fundamental frequency higher than the maximum firing rate of the stroboscopic lamp. This is achieved by means of a unique frequency division circuit which causes the lamp to fire once during multiple revolutions of the rotating part rather than once during each revolution. The result, however, is the same with a mark on the rotating body appearing "frozen."

To provide a stroboscopic lamp firing circuit in which the lamp is fired once for each cycle of an input alternating electrical signal, and wherein the phase displacement of the firing pulses for the lamp is minimized over a variation in the amplitude of the input signal. Previous to this invention, it had been common to fire the strobe lamp by limiting the input oscillatory signal, and by using the limited signal to fire a Schmitt trigger circuit. The difficulty with this previous method, however, was that as the amplitude of the input signal varied, the phase position of the leading edge of each cycle of the oscillatory signal at the firing level of the Schmitt trigger would vary also. Because of this variation in the phase position of the leading edge of the oscillatory signal, it was not uncommon to have a variation of as much as 30° of the firing point of the strobe lamp as the signal amplitude varied over a range of 10 to 1. In the present invention, on the other hand, this variation in firing point over a 10 to 1 amplitude range is reduced to 3° by (1) initially squaring the oscillatory signal, (2) differentiating the oscillatory signal and (3) thereafter utilizing the differentiated pulses to fire a monostable multivibrator which acts as a frequency divider to achieve the greater frequency response mentioned above.

To provide a battery-powered strobe firing circuit in which the drain on the battery is minimized.

The above and other objects and features of the invention will become apparent from the following detailed description taken in connection with the accompanying drawings which form a part of this specification, and in which.

GENERAL OVERALL DESCRIPTION OF VIBRATION ANALYZING APPARATUS AND ITS OPERATION

Figure 1:
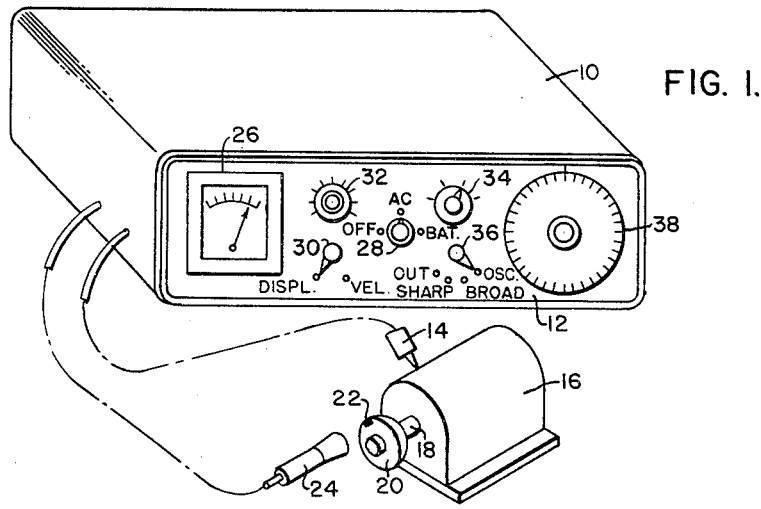
FIGURE 1 is a perspective, external view of the face of vibration analyzing apparatus constructed in accordance with the teachings of the invention and showing the manner in which the vibration analyzing apparatus of the invention is utilized.

With reference now to the drawings, and particularly to FIGURE 1, the vibration analyzing circuitry of the invention, hereinafter described in detail, is enclosed within a housing 10 having a forward face 12 which carries the controls for the vibration analyzing circuitry. Connected to the circuitry within the housing 10 is a vibration probe or pickup 14 placed in contact with a housing 16 for a body to be balanced, such as rotatable shaft 18. A suitable pickup 14 is described, for example, in U.S. Patent Nos. 2,754,435 and 3,157,852. These are seismic, velocity-type transducers.

As the shaft 18 rotates, and assuming that it is unbalanced, vibrations will be produced in the housing 16 at a frequency corresponding to the rotational speed of the shaft 18. These vibrations are detected by the electromagnetic pickup 14 which transforms them into an oscillatory signal having an amplitude proportional to the magnitude of the vibrations, a phase corresponding to the phase of the vibration, and a frequency corresponding to the speed of rotation of shaft 18. For illustrative purposes, the shaft 18 is shown as having a disc 20 secured thereto. On the disc 20 is a dark colored mark 22 which, under flashing illumination from a stroboscopic lamp 24, will appear frozen when the lamp fires at the speed of rotation of the shaft 18. Lamp 24, it will be noted, is also connected to the circuitry within the housing 10.

The forward face 12 of the housing 10 carries various controls and an amplitude meter 26 which indicates the amplitude of the vibrations activating transducer 14. Since the unit can be operated from either a conventional 120-volt alternating current outlet or from an internal battery, a three-position switch 28 is provided having an "OFF" position, an "AC" position and a "BAT." position. In most cases, it is desired to measure the displacement of the vibrations activating transducer 14; and, accordingly, a switch 30 is normally positioned as shown at "DISPL." However, should it be desired to measure the velocity of the vibrations activating the transducer 14, the switch 30 is moved to its other position, "VEL.," shown on the face 12.

Also included on the face 12 is an amplitude range selector switch 32 which controls circuitry for selectively attenuating the incoming vibrational signal such that variations in amplitude can be observed on the meter 26. Ordinarily, the amplitude range selector switch will be positioned at the least sensitive range (i.e., 100). If the meter 26 varies over a very small arc under these circumstances at the lower part of the dial, the range is changed by switch 32 until an up-scale reading on meter 26 is achieved. Of course, if the range is advanced to the point where the meter pointer remains at the upper part of the dial, the switch 32 must be turned counterclockwise to a less sensitive range.

To the right of switch 32 is a frequency range selector switch 34 which adjusts the range of the filter-oscillator within the vibration analyzing circuitry. As will hereinafter become apparent, the circuitry includes a filter adapted to attenuate all signals other than those of a selected fundamental frequency, an internal oscillator, and an amplifier which simply passes the incoming signal to the amplitude meter 26. One the face 12 is a switch 36 having four positions. In the first position shown, "OSC.," the internal oscillator is active; and in the next two positions, the mode of filter operation is selected as "BROAD" (low Q) or "SHARP" (high Q). In the "OUT" position of switch 36, both the filter and the oscillator are inactive and the incoming vibrational signal is simply passed to the amplitude meter 26. To the right of switches 34 and 36 is a tuning dial 38 which achieves a fine adjustment of the aforesaid internal filter of the analyzing equipment.

In the normal operation of the vibration analyzing apparatus, the vibration pickup 14 will be initially placed in contact with the housing 16, for example, where the mechanical vibrations can be detected. The switch 30 is normally in the displacement position, meaning that displacement is being measured. The amplitude range selector switch 32 is initially turned to the least sensitive range, and the reading on meter 26 observed. If the meter dial remains down-scale, the switch 32 is progressively rotated clockwise until a wide sweep of the dial is observed. The frequency range selector switch 34 is rotated to the desired range of expected frequencies, and ordinarily the switch 36 will be turned to the "broad" position. By directing the strobe light 24 against the mark 22 and by effecting a fine adjustment of the filter by means of the dial 38 until the mark 22 appears "frozen," it is known that the vibrational signal passing through the filter is that due to the components associated with the member 20. Thereafter, by applying trial weights to the member 20 and following conventional balancing procedures, the unbalanced condition can be corrected.

Figure 2:
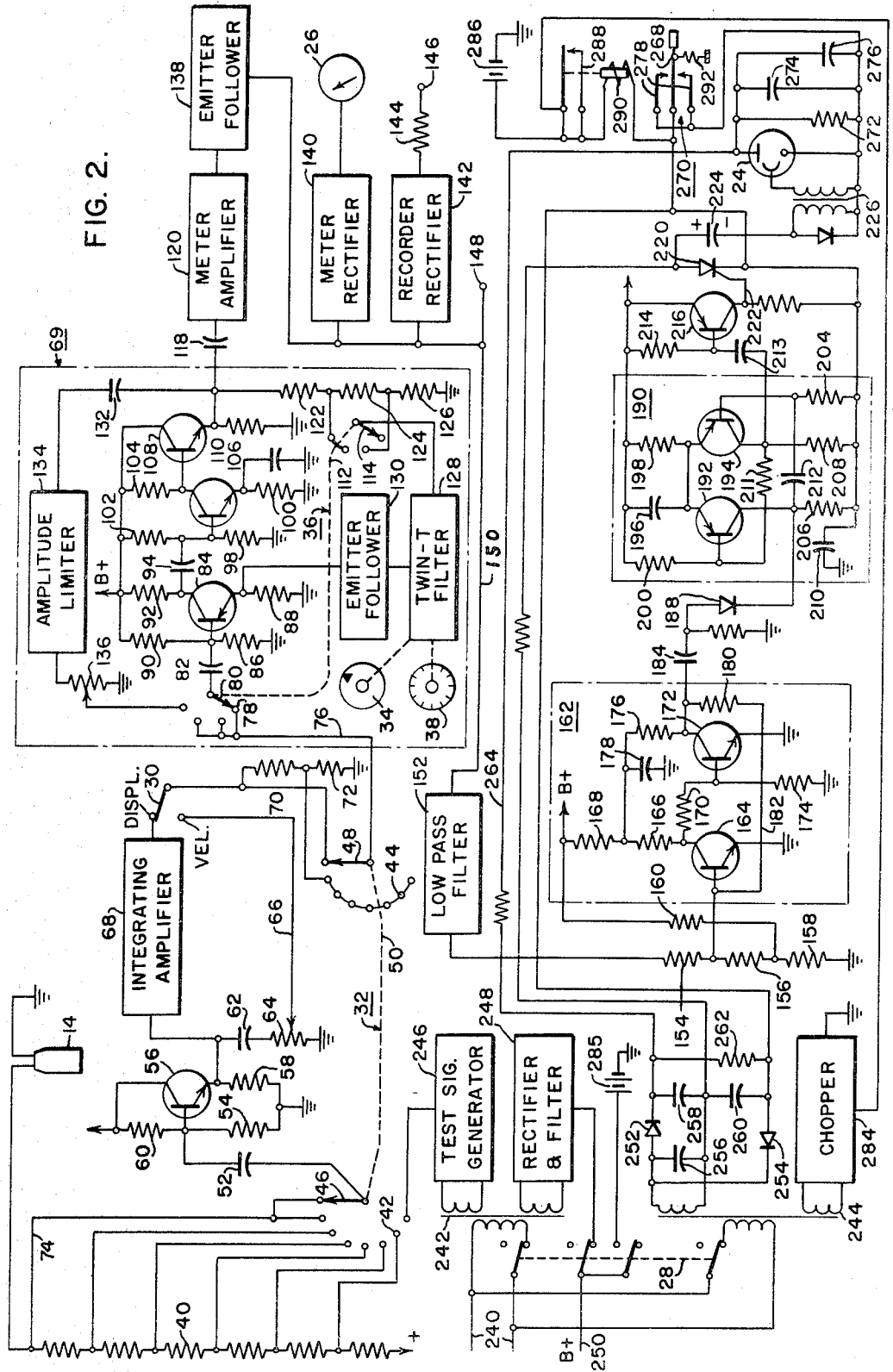
FIGURE 2 is a block and schematic circuit diagram of the vibration analyzing apparatus of the invention.

With reference, now, to FIGURE 2, a schematic and block diagram of the analyzing apparatus is shown. It includes (1) input signal attenuation, amplifying and integrating circuitry; (2) a combination amplifier, oscillator and filter network; (3) amplitude meter and recorder circuitry; (4) strobe lamp firing circuitry; and (5) an AC-DC power supply system. These will be considered separately as follows:

INPUT CIRCUIT—ATTENUATION, AMPLIFICATION AND INTEGRATION

As shown, vibration pickup 14 is connected to a voltage divider 40. The amplitude range selector switch 32 includes two contact banks 42 and 44, each provided with a movable wiper brush 46 and 48, respectively. The brushes 46 and 48 are interconnected through a mechanical linkage 50 such that both will rotate in unison. The contacts on bank 42, with the exception of the last contact, are connected to points on the voltage divider 40 such that as the wiper brush 46 is rotated in a counterclockwise direction, successively greater amounts of resistance will be introduced into the circuit. That is, the signal from vibration pickup 14 will be successively further attenuated as the wiper brush 46 is rotated in a counterclockwise direction.

The wiper brush 46 is connected through capacitor 52 and resistor 54 to ground. The signal appearing across resistor 54, comprising the input vibrational signal, is applied to the base of transistor 56 having its emitter connected to ground through resistor 58 and its collector connected to a source of B+ voltage. The base of transistor 56 is also connected to the B+ voltage source through resistor 60. Transistor 56 acts as an impedance matching device and, through capacitor 62, applies the input oscillatory signal across potentiometer 64. Potentiometer 64 is provided with a movable tap connected through lead 66 to the velocity contact of switch 30, also shown in FIGURE 1. The signal at the output of transistor 56 is also applied through an integrating amplifier 68 to the displacement contact of the same switch 30. The displacement of the vibrational signal is a measure of the distance between peaks of successive half cycles of the oscillatory signal produced by the pickup 14. It is also a measure of the distance between the back and forth limits of travel of the vibrating part. This displacement can be derived by integrating the velocity-responsive output signal of the pickup 14, i.e., the output of the transistor 56. In place of a velocity-responsive pickup, it is also possible to utilize directly a displacement-responsive pickup which produces a displacement signal as the output of the transistor 56.

The movable contact on switch 30 is connected through resistors 70 and 72 to ground. The upper end of resistor 70 is connected to the first contact on bank 44 of switch 32; while the junction of resistors 70 and 72 is connected to each of the remaining contacts on bank 44. The necessity for the second contact bank 44 arises by virtue of the high noise level of transistor 56 and those transistors used in the integrating amplifier 68. It is, of course, desirable to achieve a high signal to noise ratio; and at lower vibrational amplitudes, the signal to noise ratio can become quite low. This, of course, occurs when the wiper brushes 46 and 48 are at the upper ends of the contact banks 42 and 44. Under these conditions, very little, if any, attenuation of the signal is effected through voltage divider 40.

It will be noted that the first two contacts on bank 42 are interconnected through lead 74 to the upper end of the voltage divider 40. Thus, no attenuation of the input signal is effected until the wiper brush 46 reaches the third contact. However, in order to differentiate between the first and second contacts, the resistor 70 is employed at the output. In this manner, when the wiper brushes 46 and 48 are on the first contacts of banks 42 and 44, no attenuation of the input signal occurs prior to passage to transistor 56; and, likewise, no attenuation occurs at the output. When wiper brushes 46 and 48 are moved to the second contact points on banks 42 and 44, still no attenuation of the input signal occurs. Accordingly, the signal to noise ratio can be maximized. However, at the output, the signal is now attenuated by the resistor 70; but by this time the signal has already passed through transistor 56 and (when switch 30 is in the "DISPL." position) through the integrating amplifier 68 where the signal to noise ratio is a problem. The added resistance 70 is introduced at the output for every other position of the switch 32 such that the overall effect, aside from the noise factor, is the same as including a resistor in the voltage divider 40 between the first two contacts of bank 42.

AMPLIFIER, FILTER AND OSCILLATOR

The combination amplifier, filter and oscillator portion of the circuitry is enclosed by broken lines and identified generally by the reference numeral 69.

The signal on wiper brush 48 from integrating amplifier 68 or potentiometer 64, as the case may be, is applied through lead 76 to the first three contact points on the first bank 78 of switch 36, also shown in FIGURE 1. Thus, whenever wiper brush 80 is on any one of the first three contact points of bank 78, the input vibrational sine wave signal on wiper brush 48 will be applied through capacitor 82 to the base of transistor 84. The base and emitter of transistor 84 are connected through resistors 86 and 88, respectively, to ground; whereas the base and collector of this same transistor 84 are connected to a source of B+ voltage through resistors 90 and 92, respectively.

The output of transistor 84, appearing on its collector, is applied through capacitor 94 to the base of a second transistor 96. As shown, the base and emitter of transistor 96 are connected to ground through resistors 98 and 100, respectively; whereas the base and collector of this same transistor are connected to the B+ voltage source through resistors 102 and 104, respectively. The resistor 100 is in shunt with a by-pass capacitor 106, substantially as shown.

Finally, the output of transistor 96 appearing on its collector is direct-coupled to the base of a third transistor 108 having its collector connected directly to the B+ voltage source and its emitter connected to ground through resistor 110, the output signal being taken from transistor 108 in emitter-follower relationship.

The wiper brush 80 of switch 36 is connected through a mechanical linkage 112 to a second wiper brush 114 having a bank 116 of four contact points corresponding in position to the contact points in bank 78. With the wiper brushes 80 and 114 in the positions shown, the signal on lead 76 will be simply amplified in passing through transistors 84, 96 and 108, the amplified signal being taken from the emitter of transistor 108 and applied through capacitor 118 to a meter amplifier 120.

When, however, the wiper brushes 80 and 114 are rotated in a clockwise direction to the next contact point, a filtering action results. That is, the signal on the emitter of transistor 108 is applied across a voltage divider comprising resistors 122, 124, and 126 in series. With wiper brush 114 on the second contact point, for example, the signal taken from the emitter of transistor 108 will pass through resistors 122 and 124 and thence through wiper brush 114 to a twin-T filter network 128. The twin-T filter network 128 can be adjusted by the frequency range selector switch 34, also shown in FIGURE 1, for a particular frequency range. In this respect, the switch 34 serves to switch into the twin-T filter network 128 various combinations of capacitors for a desired frequency range. Fine tuning of the filter network 128 is effected by means of the dial 38, also shown in FIGURE 1, which is capable of gradually adjusting the resistance values of the twin-T filter. A suitable twin-T filter is described, for example, in U.S. Patent No. 3,072,868.

The output of the filter 128 is applied through an emitter follower 130 to the emitter of transistor 84. The emitter follower 130, having a high input impedance, achieves minimum loading of the filter. It will be appreciated that the twin-T filter network 128 is connected in a negative feedback loop between the transistors 84 and 108. Since the twin-T filter network 128 will pass all frequencies other than those within a narrow frequency band, the negative feedback signal applied to transistor 84 will attenuate all signals other than those at the frequency to which the filter network 128 is tuned. With the wiper brush 114 on the contact of bank 116 connected to the junction of resistors 124 and 126, the negative feedback signal applied through the filter network 128 is reduced, thereby achieving low Q filter operation. On the other hand, when the wiper brush 114 is moved clockwise to the next contact point where it is connected to the junction of resistors 122 and 124, the negative feedback signal is increased in magnitude, thereby effecting high Q operation of the filter and sharp tuning.

When wiper brushes 80 and 114 of switch 36 are rotated to the final contact points in banks 78 and 116, the twin-T filter network 128 remains in the circuit. However, a positive feedback path is now provided between the emitter of transistor 108 and the base of transistor 84 through capacitor 132, amplitude limiter 134 and variable resistor 136. The additional circuit gain due to the positive feedback results in oscillation through transistors 84, 96 and 108 at the frequency to which the twin-T filter network 128 is tuned. Assuming that the potentiometer 136 is set to just sustain oscillations, the signal amplitude within the feedback loops will not draw the amplifiers into non-linear operation. The oscillator signal thus generated is amplified by transistors 96 and 108 and used to drive the stroboscope firing circuit, hereinafter described in detail.

AMPLITUDE METER AND RECORDER CIRCUITRY

Assuming that the combination of transistors 84, 96 and 108 is being used as an amplifier or as a filter, the signal on the emitter of transistor 108 is applied through capacitor 118 to a meter amplifier 120, as mentioned above. From meter amplifier 120, the signal passes through emitter follower 138 to a meter rectifier 140 and a recorder rectifier 142, the output of the meter rectifier 140 being applied to the amplitude meter 26, also illustrated in FIGURE 1. In passing through amplifier 120, the signal is amplified to a level sufficient to minimize non-linearity in the meter rectifier 140. The emitter follower 138 provides a low source impedance for the rectifiers 140 and 142 which are of the full-wave bridge type. A separate bridge rectifier 142 and an isolating resistor 144 are employed for the direct current recorder output at 146 to prevent meter loading by low impedance recorders. By connecting a recorder to the terminal 146, the amplitude of the vibrational signal may be continuously recorded in accordance with usual techniques. Also, an oscilloscope may be connected to the output of emitter follower 138, as at terminal 148.

To review the operation of the circuit to this point, the vibrational signal from pickup 14 is selectively attenuated by voltage divider 40, in combination with switch 32, and then passed through emitter-follower transistor 56. The output signal on the emitter of transistor 56 comprises a velocity-derived signal which may be selectively integrated in integrating amplifier 68 to produce a displacement signal. A high signal to noise ratio at low vibrational amplitudes is achieved by virtue of the fact that no attenuation takes place at the input to transisor 56 on the two most sensitive ranges, scaling between these two ranges taking place by virtue of resistor 70 after the signal passes through transistor 56 and integrator 68. The signal may then be amplified in passing through transistors 84, 96 and 108, in which case the meter 26 will indicate the magnitude of the composite vibrational signal due to all vibrating parts on the equipment being balanced. However, in order to isolate the vibrational signal from a single rotating part, the twin-T filter network 128 is switched into the circuit, whereupon all signals other than those of a selected fundamental frequency can be attenuated. In this latter case, the amplitude meter 26 will indicate the amplitude of the mechanical vibrations at the selected fundamental frequency. Alternatively, the switch 36 can be positioned such that the signal on lead 76 is disconnected from transistor 84. The circuitry 69 then produces oscillations which are amplified in transistors 96 and 108. The oscillator mode of operation provides a separate means for flashing the strobe light 24 independently of the vibrational signal, the flash rate being controlled by filter 128 through control elements 34 and 38. This allows the strobe light to be used for slow-motion studies, for tuning the filter, and as a tachometer. The unique combination filter, oscillator and amplifier circuit 69 is described and claimed in copending application Ser. No. 168,048, filed Jan. 23, 1962 and assigned to the assignee of the present application.

STROBE LAMP FIRING CIRCUIT

As mentioned above, the output of the emitter follower 138 will comprise an oscillatory signal having a selected fundamental frequency, assuming that the filtering function of circuit 69 is employed. This signal is applied through lead 150 and low-pass filter 152 to a voltage divider network comprising resistors 154, 156 and 158 in series. The junction between resistors 156 and 158 is connected through resistor 160 to the B+ voltage source; while the junction between resistors 154 and 156 is connected to the input of a limiting amplifier, enclosed by broken lines and identified generally by the reference numeral 162. It comprises a first transistor 164 having its base connected to the junction of resistors 154 and 156 and its emitter connected directly to ground as shown. The collector of transistor 164 is connected through resistors 166 and 168 to the B+ voltage source, and is also connected through resistor 170 to the base of a second transistor 172, this same base being connected to ground through resistor 174. The emitter of transistor 172 is connected directly to ground; while its collector is connected to the B+ voltage source through resistors 176 and 168. The junction between the resistors 176 and 168 is connected to ground through capacitor 178. Positive feedback between the collector of transistor 172 and the base of transistor 164 is provided through resistor 180 and lead 182. This arrangement combines high gain and positive feedback to produce a square wave with fast rise time at the vibration signal repetition rate. The leading edge of the output wave form from circuit 162 is, therefore, very stable in phase with variations in input voltage. This will be explained hereinafter in greater detail.

The square wave at the output of circuit 162, i.e., at the collector of transistor 172, is differentiated by capacitor 184 and resistor 186 to produce a positive pulse at the leading edge of each square wave produced by circuit 162 and a negative pulse at the trailing edge of each square wave. The positive pulses are passed through diode 188 to the input of a monostable multivibrator, enclosed by broken lines and identified generally by the reference numeral 190.

The monostable multivibrator 190 includes two transistors 192 and 194 interconnected such that when one transistor conducts the other is cut off, and vice versa. The emitters of transistors 192 and 194 are connected to the B+ voltage source through the parallel combination of capacitor 196 and resistor 198. The base of transistor 192 is connected to the B+ voltage source through resistor 200; while the base of transistor 194 is connected to lead 202 through resistor 204.

The collectors of both transistors 192 and 194 are also connected to the lead 202 through resistors 206 and 208, respectively. Lead 202 is connected to ground through capacitor 210 and, as will hereinafter be explained, serves as a ground for the transistors 192 and 194, but only during the time that the strobe light of the analyzing equipment is in operation. In this respect, the circuit 190 differs from the circuits previously described in that those previously described are continually energized. As shown, the base of transistor 192 is connected to the emitter of transistor 194 through resistor 211.

Normally, transistor 194 will conduct while transistor 192 is cut off. However, when a positive pulse is applied to the base of transistor 194 through diode 188 and capacitor 212, transistor 194 will be cut off. This lowers the voltage at the collector of transistor 194, which lower voltage is coupled through resistor 211 to the base of transistor 192 to cause it to conduct. Transistor 194 will continue to be cut off for a predetermined period of time determined by the circuit elements of the monostable multivibrator 190, regardless of the number of input pulses applied through diode 188. After this predetermined period of time, transistor 194 will conduct, while transistor 192 will again be cut off. The result is that a pulse is produced at the collector of the transistor 194, which pulse persists for the aforesaid predetermined period of time regardless of the number of input pulses applied to the circuit.

The pulses on the collector of transistor 194 are differentiated in a differentiator comprising capacitor 213 and resistor 214, and the negative pulses resulting from the differentiation are used to trigger a transistor 216 having its emitter connected to a B+ voltage source and its collector connected to lead 202 through resistor 218. Transistor 216 serves to invert the negative input pulse to a positive output pulse at its collector.

The positive output firing pulses at the collector of transistor 216 are applied to the gate electrode 222 of a silicon controlled rectifier 220. As is known, a silicon controlled rectifier operates in a manner similar to a conventional thyratron. Once a firing pulse is applied to the gate electrode 222 of rectifier 220, the gate electrode loses control, and the rectifier will continue to conduct until its anode voltage is lowered. The anode voltage for the silicon controlled rectifier 220 is supplied by charging a capacitor 224 with the polarity shown in a manner hereinafter described. When the rectifier 220 conducts, the capacitor 224 will be discharged to the point where the anode voltage no longer supports conduction in the rectifier 220, whereupon it will again cut off and will remain cut off until a succeeding firing pulse is applied to the gate electrode 222. When rectifier 220 conducts and capacitor 224 discharges, a pulse is produced across the secondary winding of a transformer 226, which pulse is applied to the control electrode of strobe lamp 24 to cause it to fire.

Figure 3:
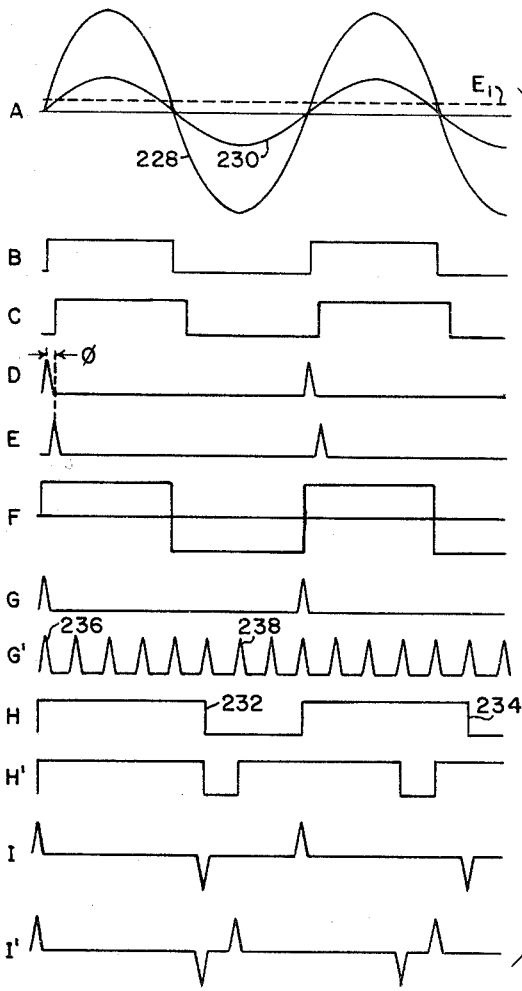
FIGURE 3 comprises a series of wave forms appearing at various points in the circuit of FIGURE 2 and illustrating the operation of the strobe lamp firing equipment of the invention.

The operation of square-wave shaper 162 and the monostable multivibrator 190 in combination with the silicon controlled rectifier is perhaps best shown in FIGURE 3. Wave form A in FIGURE 3 illustrates two vibrational sine wave signals 228 and 230, both of the same frequency and phase but differing in amplitude, the signal 228 being much greater in amplitude than signal 230. As was explained hereinbefore, it has been the practice to use the sine wave vibrational signal, such as signal 228 or 230, to trigger a Schmitt trigger circuit, the output pulses from the Schmitt trigger being differentiated to produce spiked pulses which fired a thyratron or the like. A Schmitt trigger circuit, however, is a type of multivibrator which will change stable states whenever the amplitude of an input signal applied thereto rises above a predetermined level. In wave form A, this level may, for example, be that indicated by the voltage level $E_1$. If the sine wave 228 is applied to a Schmitt trigger circuit adjusted to fire at voltage level $E_1$, square wave form B will result. On the other hand, when sine wave 230 of the same frequency but of smaller amplitude is applied to the same Schmitt trigger circuit, wave form C will result. By differentiating wave form B and eliminating the negative spiked pulses at the trailing edges of the square waves, wave form D will result; while the same process on wave from C will produce wave form E. Wave form D or E, depending upon the amplitude of the input signal, can then be used to fire the strobe lamp 24; and it will be noted that the pulses in wave form E are displaced with respect to those in wave form D by the angle $\phi$. It is for this reason that with prior art systems utilizing a Schmitt trigger circuit in the strobe firing circuit, the output pulse used to trigger the strobe light could vary as much as 30° over a 10 to 1 amplitude range of the input signal. Furthermore, since the maximum strobe lamp repetition rate is about 80 cycles per second, the maximum frequency of the vibrational signal which could be used to fire the strobe lamp was also about 80 cycles per second.

In accordance with the present invention, the frequency range is greatly extended and the phase shift in the firing pulses resulting from changes in amplitude is greatly decreased over prior art systems. Minimizing the variation in phase of the firing pulses is achieved by squaring the input sine wave signal. This produces at the output of circuit 162 wave form F in FIGURE 3 in which the leading edge of each pulse in the square wave form can vary over a very slight phase difference. This wave form, when differentiated in capacitor 184 and resistor 186, produces pulses in wave form G which are very stable in phase. Should the frequency of the input sine wave signal increase, the output of circuit 162 may appear as wave form G' in FIGURE 3 wherein the number of pulses is materially increased. It will be assumed, for example, that the repetition rate of the pulses in wave form G' is above 80 cycles per second, meaning that they cannot be used to fire the strobe lamp 24. When wave form G, for example, is applied to the monstable multivibrator 190, wave form H is produced in which pulses 232 and 234 are produced, both of equal or fixed length and having their leading edges coinciding with the spiked pulses in wave form G. If wave form G' is now applied to the monostable multivibrator 190, the pulse 236 will cause transistor 194 to cut off. However, the next four pulses in wave form G' will be ineffective to alter the conditions of circuit 190 since, as explained above, the circuit fires and remains in one stable state for a predetermined period of time, regardless of the number of input pulses applied thereto. Thus, the next spiked pulse in wave form G' to trigger monostable multivibrator 190 is pulse 238. This produces wave form H' in FIGURE 3; and by differentiating wave forms H and H', wave forms I and I', respectively, result.

The positive pulses in wave forms I and I' are used to trigger the silicon controlled rectifier 220; and it will be appreciated that the effect of applying the output of circuit 162 to the monostable multivibrator 190 is to divide the frequency of the pulses downwardly, assuming that that frequency exceeds the maximum firing frequency of the strobe lamp 24. In both cases, however, the pulses in wave form I or I' are in phase coincidence with corresponding ones of the pulses in wave form G or G'.

AC-DC POWER SUPPLY

Alternating current power for the vibration analyzing apparatus is applied to input terminals 240 (FIGURE 2) and can be applied through contacts of switch 28, also shown in FIGURE 1, to the primary windings of transformers 242 and 244. Transformer 242 is provided with a secondary winding connected to a test signal generator 246, the output of the test signal generator 246 being applied to the last contact point on bank 42 of switch 32. When wiper brush 46 is on the last contact point connected to generator 246, a sine wave signal is applied through the circuitry for testing and calibration purposes. A second secondary winding on transformer 242 is connected to a rectifier and filter circuit 248 which, through a second contact on the switch 28, generates the B+ voltage supply on terminal 250 for all of the circuitry heretofore described.

The alternating current signal applied to terminals 240 also drives, through transformer 244, a voltage doubler full-wave rectifier comprising diodes 252 and 254, together with capacitors 256, 258 and 260. Resistor 262 serves as a load resistor for the full-wave rectifier such that a full-wave rectified direct current voltage will appear across leads 264 and 266. Lead 266, of negative polarity, is connected to lead 202 and to the movable contact 268 of a switch 270 for strobe lamp 24. Lead 264 is connected to the anode of the strobe lamp 24; and in shunt with strobe lamp 24 is a resistor 272 and two capacitors 274 and 276.

When the movable contact 268 of switch 270 moves into engagement with either of the contact points 278, a circuit is completed from the cathode of strobe lamp 24, through switch 270 to lead 202. Hence, when switch 270 is closed, the strobe lamp 24 can be fired. The voltage appearing between lead 280 and lead 266 comprises a half-wave rectified voltage which is applied via resistor 282 between the anode and cathode of the silicon controlled rectifier 220. This, then, comprises the anode potential supply for the rectifier 220.

Thus far, the circuitry has been described as it is operated from a conventional 120-volt alternating current supply applied to terminals 240. When, however, it is desired to operate the circuitry from an internal battery supply, the switch 28 is reversed whereby terminals 240 are disconnected from the primary windings on transformers 242 and 244. At the same time, a battery anode voltage supply 285 is connected to the B+ terminal 250 through the switch 28.

As will be understood, a relatively heavy battery drain is effected when the strobe lamp 24 is fired. In order to produce the rectified voltages for silicon controlled rectifier 220 and strobe lamp 24, a chopper 284 is provided with an output winding inductively coupled to the core of transformer 244. When the chopper 284 is operating, rectified voltages will appear between leads 264 and 266, and between leads 280 and 266 in the manner described above. The power supply for the chopper 284 comprises a battery 286 which is normally disconnected from the chopper 284 by contact 288 on relay 290. In order to energize relay 290, the movable contact member 268 of switch 270 must be moved into contact with one of the two stationary contacts 278, thereby completing a circuit between the positive terminal of battery 286 and ground. The movable contact member 268 may be moved downwardly and locked into engagement with the lower contact member 278 by any suitable locking means, not shown. Alternatively, it may be moved upwardly under the force of a return spring 292 into contact with the upper stationary contact 278, when the device is operated on the batteries 285 and 286, the operator will move the contact member 268 upwardly against the force of the spring such that when he releases the movable contact member 268, no further current is drawn from battery 286. In this manner, the high power drain from battery 286 is utilized only during the time that the strobe lamp 24 is actually firing, and at no other time.

Although the invention has been shown in connection with a certain specific embodiment, it will be readily apparent to those skilled in the art that various changes in form and arrangement of parts may be made to suit requirements without departing from the spirit and scope of the invention.

We claim:

1. In vibration analyzing apparatus of the type in which a strobescopic lamp is caused to fire in phase synchronism with an input oscillatory vibrational signal such that a mark on a rotating member which produces the vibrational signal appears frozen under the influence of the stroboscopic lamp and wherein the firing rate of the stroboscopic lamp is limited by an upper maximum firing frequency; the combination of an electromagnetic pickup device for producing said oscillatory vibrational signal, means including limiting amplifying means for converting said oscillatory signal into a square wave signal in which the leading edge of each square wave does not vary substantially in phase with changes in amplitude of an oscillatory input signal of a given frequency, and means including a differentiator and a monostable multivibrator responsive to said square wave signal for causing the stroboscopic lamp to fire once during a plurality of revolutions of the rotating member rather than once during each revolution after the frequency of the oscillatory vibrational signal exceeds a predetermined limit.

2. In vibration analyzing apparatus of the type in which a stroboscopic lamp is caused to fire in phase synchronism with an input oscillatory vibrational signal such that a mark on a rotating member producing the vibrational signal appears frozen under the influence of the stroboscopic lamp, and wherein the firing rate of the stroboscopic lamp is limited by an upper maximum firing frequency; the combination of an electromagnetic pickup device for producing said oscillatory vibrational signal, a limiting amplifier and a differentiator responsive to said oscillatory signal for generating a differentiated pulse once during each cycle of the vibrational oscillatory signal, a monostable multivibrator responsive to said differentiated pulses for producing a pulsed signal in which the leading edge of each pulse coincides with a corresponding one of said differentiated pulses, the length of the pulses in said pulsed signal being constant regardless of the repetition rate of the differentiated pulses applied to said monostable multivibrator, a differentiator coupled to the output of said monostable multivibrator, and means for firing said stroboscopic lamp in response to differentiated pulses at the output of said last-named differentiator.

3. The combination of claim 2 and including a silicon controlled rectifier, means for applying the differentiated pulses from said multivibrator to the gate electrode of the silicon controlled rectifier whereby the silicon controlled rectifier will fire each time a differentiated pulse is applied thereto, and means connecting the silicon controlled rectifier to said stroboscopic lamp whereby the stroboscopic lamp will fire each time the silicon controlled rectifier fires.

4. Circuit apparatus for firing a stroboscopic lamp in phase synchronism with an input oscillatory signal, comprising limiting amplifying means for converting said oscillatory input signal into a square-wave signal having leading edges which are stable in phase with variations in amplitude of the oscillatory input signal, means for differentiating the square-wave output from said amplifying means to produce differentiated pulses coinciding in phase with the leading edges of said square-wave output signal, a monostable multivibrator responsive to the differentiated pulses for producing square-wave pulses all of constant time duration regardless of the frequency of the input oscillatory signal, the leading edges of the square-wave pulses at the output of said multivibrator coinciding in phase with associated ones of said differentiated pulses, means for differentiating said square-wave pulses to produce a second series of differentiated pulses, and means responsive to said second series of differentiated pulses for firing said stroboscopic lamp each time a pulse in said second series of differentiated pulses is applied thereto.

5. Circuit apparatus for firing a stroboscopic lamp in phase synchronism with an input oscillatory signal, comprising limiting amplifying means for converting said oscillatory input signal into a square-wave signal, means for differentiating the square-wave output from said amplifying means, a monostable multivibrator responsive to the differentiated output of the amplifying means for producing square-wave pulses all of constant time duration, means for differentiating said square-wave pulses to produce a series of differentiated pulses, a silicon controlled rectifier, means for applying said series of differentiated pulses to the silicon controlled rectifier, and means coupled to said silicon controlled rectifier for firing said stroboscopic lamp each time a pulse is applied to the silicon controlled rectifier.

6. In vibration analyzing apparatus of the type in which a stroboscopic lamp is fired in synchronism with an oscillatory vibrational signal, the combination of means for filtering the oscillatory signal to attenuate all signals other than those produced by a single vibrating element, a stroboscopic lamp firing circuit including a silicon controlled rectifier, a stroboscopic lamp which is fired each time the silicon controlled rectifier is fired, battery means for supplying energizing potentials to the stroboscopic lamp and the silicon controlled rectifier, and switch means for connecting the battery means to the stroboscopic lamp and the silicon controlled rectifier only during the time that the stroboscopic lamp is being fired.

7. In vibration analyzing apparatus of the type in which a stroboscopic lamp is fired in synchronism with an oscillatory vibrational signal, the combination of means for filtering the oscillatory signal to attenuate all signals other than those produced by a single vibrating element, a stroboscopic lamp firing circuit including a monostable multivibrator coupled to the output of said filtering means and responsive to pulses having a repetition rate equal to the frequency of said oscillatory signal, a silicon controlled rectifier operatively connected to the monostable multivibrator, a silicon controlled rectifier, a stroboscopic lamp which is fired once each time the silicon controlled rectifier is fired, means for supplying energizing potentials to the monostable multivibrator, the silicon controlled rectifier and stroboscopic lamp, and switch means for connecting the battery means to the monostable multivibrator, the stroboscopic lamp and the silicon controlled rectifier only during the time that the stroboscopic lamp is being fired.

8. In vibration analyzing apparatus of the type in which a stroboscopic lamp is fired in synchronism with an oscillatory vibrational signal, the combination of means for filtering the oscillatory signal to attenuate all signals other than those due to a single vibrating element, a stroboscopic lamp firing circuit including a silicon controlled rectifier which is fired each time the stroboscopic lamp is fired, battery means for supplying energizing potentials to the stroboscopic lamp and the silicon controlled rectifier, electronic chopper means for converting the direct current output of said battery means into an alternating current signal, rectifying means inductively coupled to said chopper means for producing a rectified voltage the magnitude of which is greater than the voltage output of said battery means, means for applying the output of said rectifying means between the anodes and cathodes of the silicon controlled rectifier and stroboscopic lamp, and switch means for connecting the battery means to the chopper means only during the time that the stroboscopic lamp is being fired.

References Cited

UNITED STATES PATENTS

| | | | |
|---|---|---|---|
| 2,785,215 | 3/1957 | Yetter | 315—241 |
| 2,941,396 | 6/1960 | Adams | 324—16 |
| 3,274,486 | 9/1966 | Gould et al. | 324—70 |
| 3,353,062 | 11/1967 | Nuckolls | 315—209 |

RICHARD C. QUEISSER, Primary Examiner

JOHN R. FLANAGAN, Assistant Examiner